Jan. 6, 1925.                                                1,521,651
O. SCHLAUPITZ
GAUGE
Filed June 25, 1923            2 Sheets-Sheet 1

Inventor:
Oswald Schlaupitz,
by his Attorneys

Jan. 6, 1925.

O. SCHLAUPITZ

GAUGE

Filed June 25, 1923  2 Sheets-Sheet 2

1,521,651

Inventor:
Oswald Schlaupitz
by Cann & Cann
His Attorneys.

Patented Jan. 6, 1925.

1,521,651

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

GAUGE.

Application filed June 25, 1923. Serial No. 647,553.

*To all whom it may concern:*

Be it known that I, OSWALD SCHLAUPITZ, a citizen of the United States, and a resident of the city of Canton, in the county of Stark and State of Ohio, have invented a new and useful Improvement in Gauges, of which the following is a specification.

My invention relates to gauges that will determine the diameter and the roundness and parallelism of the surfaces of circular cavities, such as the cylindrical bores of inner bearing members for roller bearings and the like and it has for its principal object to devise a gauge that is provided with detachable and interchangeable work supporting means, whereby one gauge may be used for gaging articles of various sizes. The invention consists principally in providing a gauge with a detachable work supporting member, which may be replaced by a different work supporting member adapted to accommodate inner bearing members or the like of a different size. The invention further consists in the parts and in the combinations and arrangements of parts hereinafter described and claimed.

Figure 1:
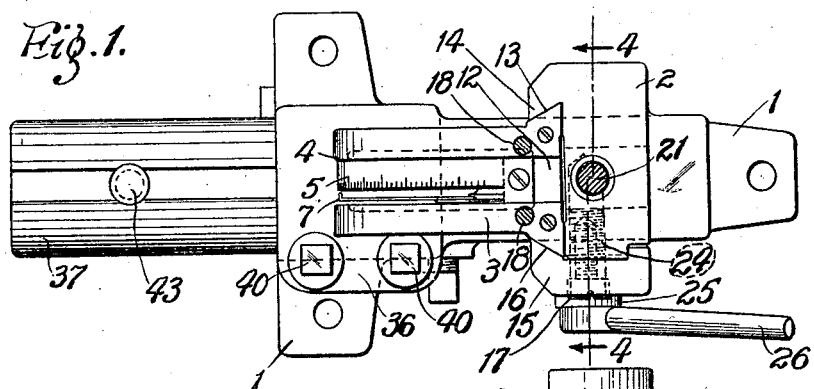
Figure 2:
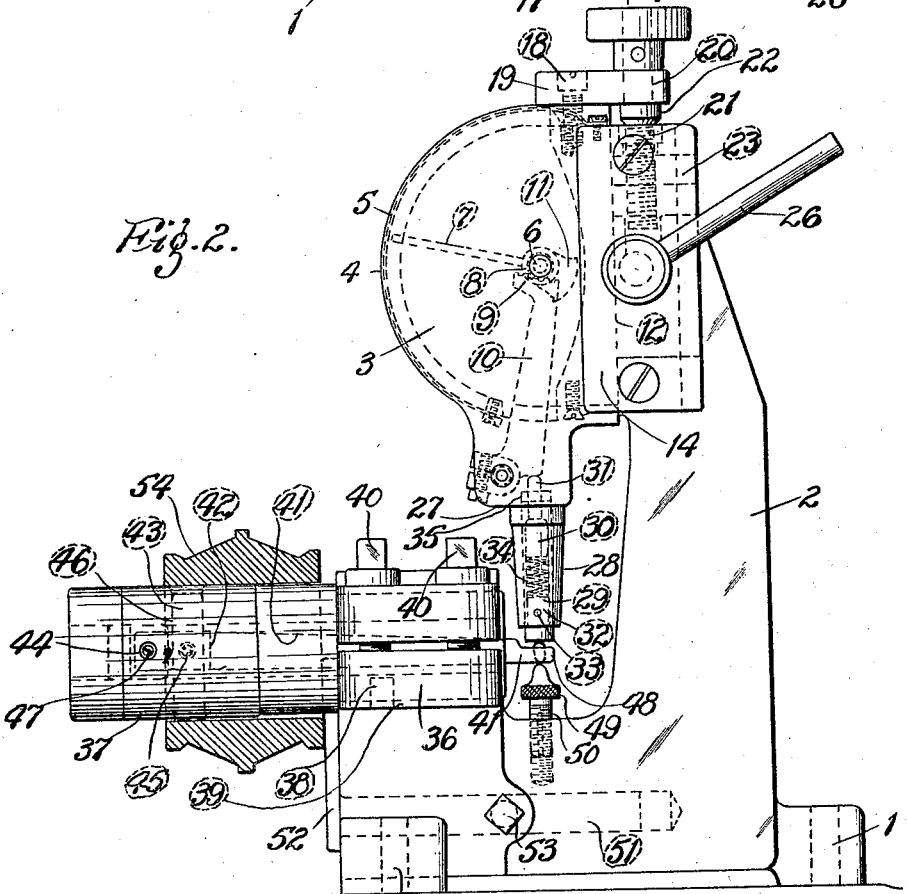
Figure 3:
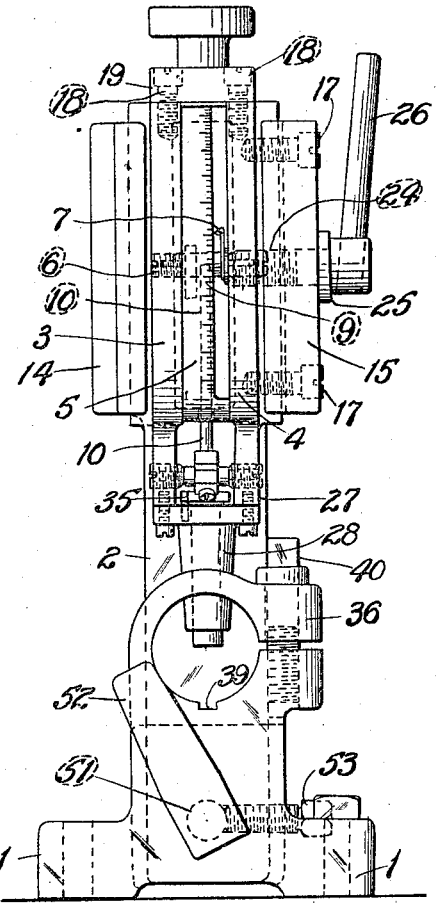
Figure 4:
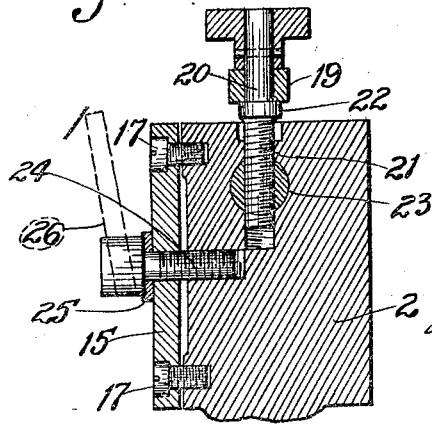

In the drawings, which form part of this specification and wherein like reference characters indicate like parts wherever used, Fig. 1 is a top plan view of a gauge embodying my invention, certain parts at the top of the gauge being omitted for the sake of clearness, Fig. 2 is a side elevation, Fig. 3 is an end elevation; and Fig. 4 is a sectional view on the line 4—4 in Fig. 2.

The base 1 of the gauge has an upwardly extending frame portion 2, in the top of which is secured a hollow housing 3. One face 4 of said housing is in the form of an arc, and to it is secured an arcuate scale plate 5. Pivotally mounted in said housing 3 is a shaft 6 to which is secured a pointer 7 for cooperating with the graduated scale. Said shaft 6 is provided with a pinion 8 that meshes with a segment gear 9 on the upper end of a lever 10 whose lower end is pivotally secured in the housing 3. The shaft 6 is provided with a weight 11 to balance the pointer 7.

The back 12 of the hollow housing has beveled edge portions 13. The frame 2 has a jaw 14 that is beveled or undercut to cooperate with one beveled edge portion 13 of the housing, and secured to the other side of the frame is a plate 15 that has a jaw 16 that is shaped or undercut to cooperate with the other beveled edge 13 of the housing. Thus the housing 3 is held in the frame 2 by a dove-tail connection. The plate is secured to the frame by means of screws 17 and these screws are tightened sufficiently to hold the housing against sliding, but to permit movement thereof if sufficient force is applied to overcome the frictional engagement of the housing with the jaws of the frame and plate.

Secured to the top of the housing as by a screw 18 is an arm 19 that extends over the top of the frame 2. Passing through a hole in said arm 19 is the unthreaded shank portion 20 of a screw 21 that is threaded into the top of the frame. The screw is provided with a collar 22 beneath the arm; so that the arm is held between the collar 22 and the head of the screw 21 and is incapable of longitudinal movement relative to the screw.

Preferably the frame 2 is provided with a transverse hole in which is mounted a plug 23 that has a threaded hole therethrough that receives the threaded portion of the screw 21. The plug 23 may be replaced with a new plug when the threads become worn. Thus the parts may be kept in good working condition without scrapping the entire frame 2.

As the screw 21 is turned the housing 3 is raised or lowered. Thus the housing may be secured in any desired position in the frame. A screw 24 is mounted in a threaded hole in the frame and extends through the plate 15. A washer 25 is preferably interposed between the head of the screw 24 and the plate 15. The screw 24 is provided with a handle 26 for turning it. By turning the handle 26 the screw 24 is made to force the plate 15 closer to the frame 2 than the position in which it is held by the screws 17 above mentioned. This clamps the housing firmly in place and prevents movement thereof after the desired adjustment has been obtained.

Secured to the lower end 27 of the housing underneath the lever 10 is a hollow member 28 in which is mounted a plunger shell 29. Slidably mounted in said shell 29 is a pin 30 that has a reduced upper portion 31 that projects through a hole in the end of the shell. In the lower end of the shell is a plug 32 that is secured therein, as by a screw 33. Between the plug 32 and the lower end of the pin 30 is a spring 34 that tends to keep the pin 30 in its uppermost position in the shell 29. The upper end of the shell 29 is provided with projecting lugs 35 so that it is prevented from dropping out of the bore of the hollow member.

The base 1 is provided adjacent to the end of the depending portion of the housing 2 with a split clamp member 36 in the bore of which is mounted the end of a hollow work receiving and supporting member 37. The work receiving member is provided with a key 38 that fits in a slot 39 in the clamping member so that the work receiving member is held against rotary movement. The free ends of the clamp member are provided with alining threaded holes in which are disposed suitable screws 40 by means of which the parts of the clamp member may be tightened up to hold the work receiving member 37 in position.

Aside from its removability, the work receiving member and its contained mechanism are similar in construction and operation to those shown in my Patent No. 1,435,666, dated November 14, 1922, for indicating gauge, to which reference is hereby made.

Located within the bore of the supporting member 37 and extending therefrom to a point beneath the plunger shell is a lever arm 41. The lever arm is provided at its front end with an elongated vertical notch 42 adapted to receive a vertically disposed cylindrical contact pin 43 and a horizontally disposed cylindrical fulcrum stud 44. The contact pin is of reduced width midway of its length to fit within the notch of the lever arm and is removably held therein by means of a horizontal screw 45. The contact pin 45 has a free sliding fit in a transverse bore 46 in the supporting member, said bore being disposed with its axis vertical and intersecting the horizontal bore of the supporting member.

The fulcrum stud 44 is mounted in the axial bore of the supporting member between the contact pin 43 and the front end of said member and has a reduced portion adapted to be embraced by the notch formed in the front end of the lever arm. The lever arm 41 is pivotally secured to the fulcrum stud 44 by means of a removable pivot screw 47 which extends horizontally through the interfitting portions of said lever arm and said stud. The contact pin is adapted to contact with the surface of the work at its lower end only and said end is preferably curved to conform to the radius of the supporting member.

The free end 48 of the lever arm 41 in the inoperative position thereof is supported on the upper end of a vertical stop pin 49. The stop has a threaded head portion 50 which is threaded into the base. Thus the position of the lever may be changed by turning the stop pin.

Mounted on a rod 51 that is disposed in a bore in the base is an arm 52. The rod is capable of rotary and lengthwise movement and may be held in any desired position by means of a set screw 53.

The cone 54 or the like to be gaged is placed on the work receiving member 37 and moved back and forth and rotated so that all portions of the bore thereof may be gaged. The arm 52 is set so that the cone will abut against it before moving clear of the contact pin 43. A large double cone is shown in the drawings. If a small single cone is to be gaged, the stop arm 52 will be moved away from the base so as to prevent the cone from slipping past the contact pin.

When it is desired to gauge cones of a different diameter, the work receiving member 37 is removed from the base and a different work receiving member is inserted in place. The end of the lever 41 of the work receiving member rests on a stop pin 49 as above pointed out. The stop pin is adjusted so that the lever is held in such position that the end of the contact pin projects below the work receiving member a distance that represents the bore of a cone that is very slightly above the maximum limits. The object of this position is to reduce to as small an amount as possible the movement required of the contact pin to get inside of the bore of a cone and consequently to reduce to as small an amount as possible the travel of the pointer.

After a new work receiving member has been put in position, a master cone is placed thereon and the housing raised or lowered until the pointer points exactly to zero on the scale. The housing is then clamped in place and the gauge is ready for work.

If the pointer 7 is moved so that it reaches the end of the slot in the housing, any further movement of the pointer is taken up by the spring 34. Thus damage to the indicating mechanism is prevented.

The gauge hereinbefore described has numerous advantages. It makes it possible to gauge cones of various sizes with one gauge, thus greatly reducing the number of gauges that are required to be kept on hand. The adjustable stop for the work makes the gauge easy to operate and prevents the work from slipping off the contact pin. The plunger construction prevents damage to the working parts in the case of a cone that is greatly off size.

Obviously, a different form of indicating mechanism from that shown in the drawing may be used and numerous other changes may be made without departing from the invention and I do not wish to be limited to the precise construction shown.

What I claim is:

1. A gauge comprising a base, a clamp member on said base, said clamp member having a bore and being split the length of said bore, a work receiving member having a portion adapted to extend into the bore of said clamp member, and screws extending through holes provided therefor in the marginal portions of said clamp member on either side of the split therethrough, whereby said clamp member may be tightened to hold said work receiving member or loosened to release the same.

2. A gauge comprising a work support, a lever mounted therein and projecting therefrom, said lever having a contact member in position to be engaged and actuated by the work being gauged, a gauging and indicating mechanism having a portion contacting with said lever and means for bodily shifting said gauging and indicating mechanism relatively to said work support.

3. A gauge comprising a work support, a lever mounted therein and projecting therefrom, said lever having a contact member in position to be engaged and actuated by the work being gauged, a gauging and indicating mechanism having a portion contacting with said lever and means for bodily shifting said gauging and indicating mechanism relatively to said work support and for securing it in desired position.

4. In a gauge, a frame having an undercut jaw portion along one edge, a plate secured to the opposite edge of said frame and having a counterpart undercut jaw portion, a housing having beveled edges that fit in the jaws of said frame and of said plate respectively and means for tightening and loosening said plate.

5. A gauge comprising a frame, a housing secured thereto, a gauging mechanism in said housing, said housing having a projecting portion overhanging said frame and a screw mounted in said projecting portion so as to be capable of rotation but held against endwise movement, said screw extending into a threaded hole in said frame, whereby said housing may be moved by turning said screw.

6. A gauge comprising a frame, a housing secured thereto, a gauging mechanism in said housing, said housing having a projecting portion overhanging said frame, a screw mounted in said projecting portion so as to be capable of rotation but held against endwise movement, said screw extending into a threaded hole in said frame, whereby said housing may be moved by turning said screw, and means for securing said housing against movement when desired.

7. A gauge comprising a frame having an undercut jaw portion along one edge, a plate secured to the opposite edge and having a counterpart undercut jaw portion, a housing having beveled edges that fit in said jaws of said frame and plate, means for moving said plate toward and away from said frame, to prevent and to permit movement of the housing, said housing having a projecting portion overhanging said frame, a screw in said projecting portion capable of rotation but held against endwise movement, said frame having a threaded hole to receive said screw, whereby turning said screw moves said housing when said plate is moved away from said frame.

8. A gauge comprising a frame having an undercut jaw portion along one edge, a plate secured to the opposite edge and having a counterpart undercut jaw portion, a housing having beveled edges that fit in said jaws of said frame and plate, means for moving said plate toward or away from said frame, to prevent or to permit movement of the housing, said housing having a projecting portion overhanging said frame, a screw in said projecting portion capable of rotation but held against endwise movement, said frame having a recess therein, a plug in said recess, said plug and frame having alining holes adapted to receive said screw, whereby turning said screw moves said housing when said plate is moved away from said frame.

OSWALD SCHLAUPITZ.